No. 755,874. Patented March 29, 1904.

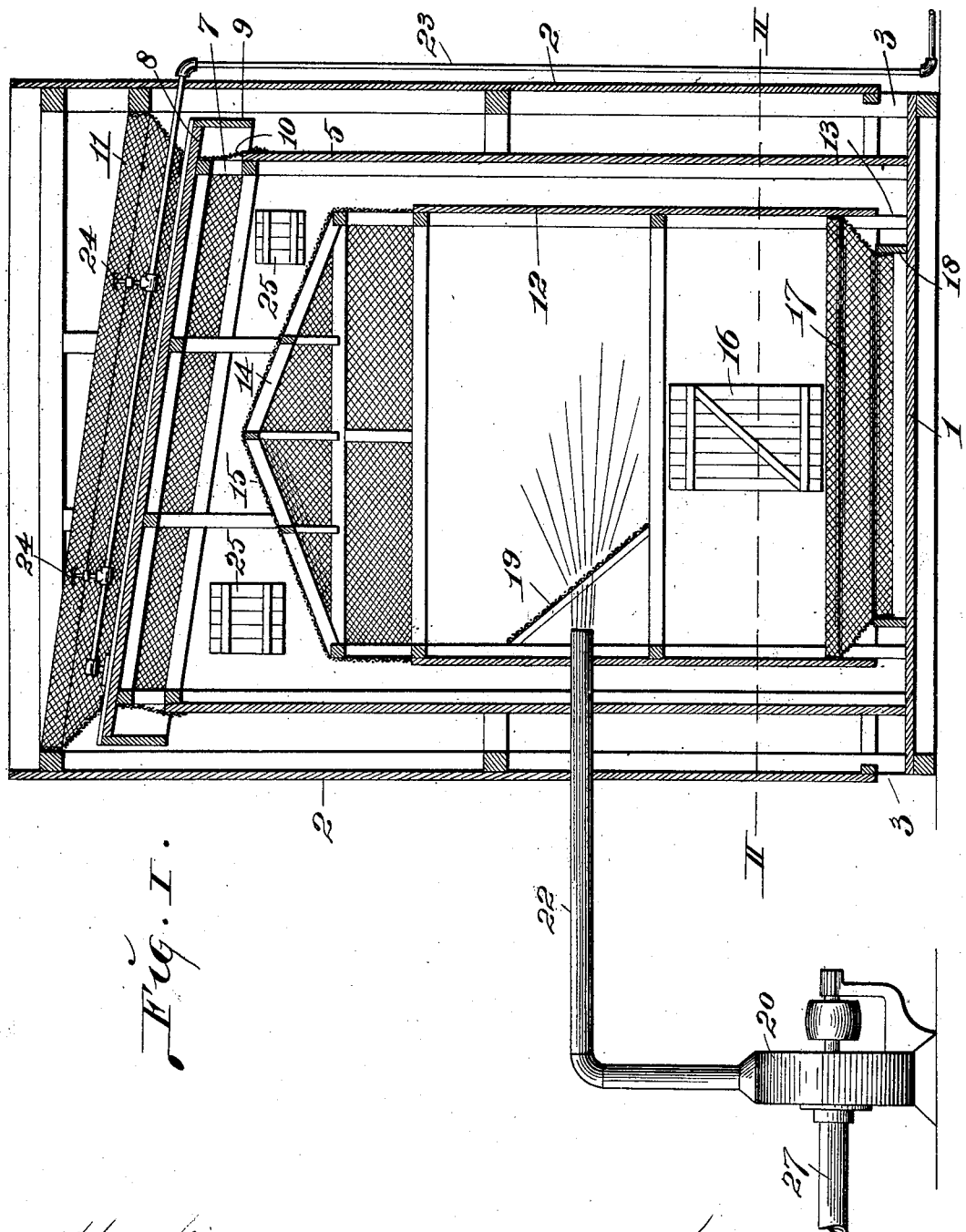

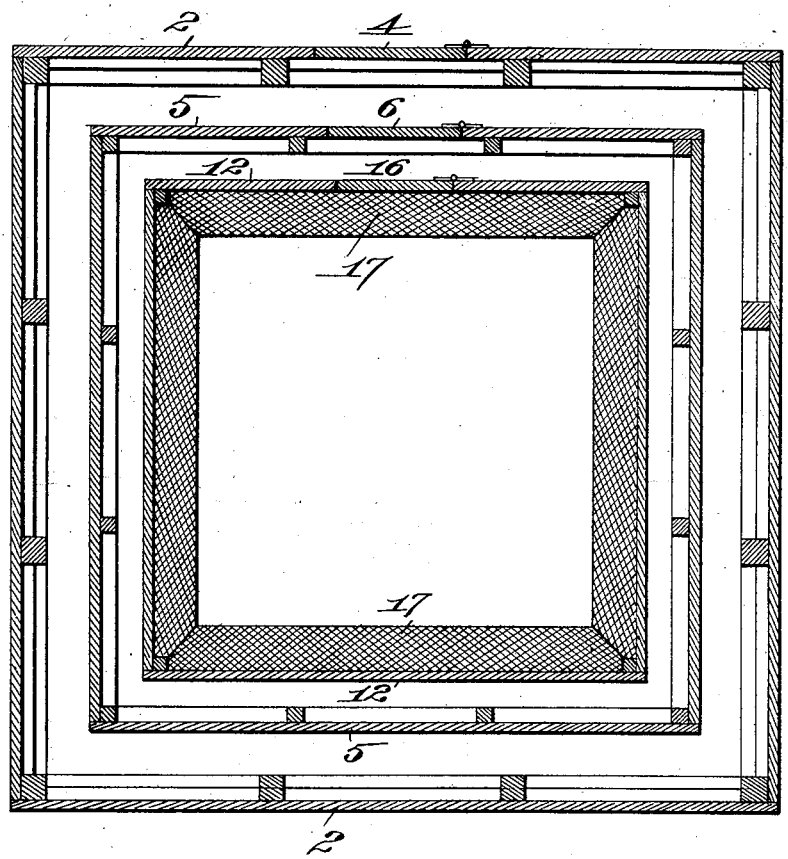

UNITED STATES PATENT OFFICE.

DENIS F. HOGAN, OF ST. LOUIS, MISSOURI.

DUST-COLLECTOR.

SPECIFICATION forming part of Letters Patent No. 755,874, dated March 29, 1904.

Application filed August 21, 1903. Serial No. 170,239. (No model.)

*To all whom it may concern:*

Be it known that I, DENIS F. HOGAN, a citizen of the United States, residing in the city of St. Louis and State of Missouri, have invented certain new and useful Improvements in Dust-Collectors, of which the following is a full, clear, and exact description, reference being had to the accompanying drawings, forming part of this specification.

My invention relates to a structure designed for use in collecting dust in a plant of any description where large quantities of dust are produced and which, if uncollected, prove a source of annoyance and injury to the health of employees of the plant and also a nuisance in the territories surrounding the plant.

The collector is particularly designed for use in connection with asphalt plants or bituminous-macadam-paving plants or for cement-mills, lead-works, and pulverizing-mills, or any plant in which there is large production of dust.

The object of my collector is not only to efficiently collect and settle the dust, but the collector has in view the further object of collecting and confining the dust in a totally dry state, so that it will remain of value in the arts.

The invention also has a further object—the settling of any small percentage of dust that may pass through the collector to avoid the escape and distribution of such small percentage into the air surrounding the collector.

My invention consists in features of novelty hereinafter fully described, and pointed out in the claims.

Figure I is a vertical section taken through my dust-collector. Fig. II is a horizontal section taken on line II II, Fig. I.

My dust-collector comprises a structure in which are present a series of three housings, two inclosed by the outermost, and means in the structure by which the greater percentage of the dust delivered into the innermost housing is collected and deposited therein in a dry condition when blown thereinto from a suitable fan or blower, means whereby the dust that escapes from the innermost housing is partially deposited within said intermediate housing, means whereby the dust escaping from the intermediate housing is retained within the outer housing, and, lastly, means by which the very small percentage of dust escaping from the outer housing is allayed by the application of moisture thereto to effectually settle it.

The structure which I have briefly described in the foregoing has a floor 1, that is surmounted by the set of housings referred to. Of such housings, 2 designates the outermost housing, which is open at the upper end, and the lower end of which is slightly elevated from the floor 1 to provide an escape-space 3 beneath the housing leading to the exterior of the structure. (See Fig. I.) In the housing 2 is a door 4. (See Fig. II.)

5 designates the intermediate housing, having a door 6 opposite the door in the outer housing. This housing 5 extends from the floor of the structure upwardly to a point beneath the top of the outer housing 2, and at its upper end is a skeleton frame 7, that is surmounted by a roof 8. Depending from the roof 8 is a rim 9, which surrounds the skeleton frame 7 at a short distance therefrom, as seen in Fig. I.

10 is a porous screen surrounding the skeleton frame 7, the screen being preferably of burlap or other fabric.

11 is a screen surrounding the roof 8 and extending therefrom to the outer housing 2 and dividing the space between said outer housing and the intermediate housing 5 from the space above the roof of the intermediate housing.

12 designates the inner housing of the structure, the lower end of which is elevated from the floor 1 of the dust-collector structure to provide a space 13 beneath it, as seen in Fig. I. At the upper end of the inner housing is a skeleton frame 14, that is surrounded by a screen 15, which constitutes the roof of said inner housing. The screen 15 is porous and preferably of fabric, such as burlap, and is of similar nature to the screens 10 and 11, hereinbefore mentioned. In the wall of the housing 12 is a door 16, opposite the doors 6 and 6 in the outer and intermediate housings 2 and 5.

17 is a screen located within the lower end of the inner housing 12 above the space 13 beneath said housing and extending from the housing to a partition 18, surmounting the floor 1.

19 designates a spreader-screen situated in the inner housing 12, at one side thereof. This spreader-screen is preferably of wire-gauze or may be of any other coarse material.

20 designates a blower that receives the connection of a delivery-pipe 21, through which the dust to be collected is drawn from the room in which it is produced.

22 is a conducting-pipe through which the dust delivered to the blower is conveyed to the interior of the inner housing 12 and forced into said housing through the spreader-screen 19.

23 designates a water-conducting pipe leading from any suitable source of supply into the dust-collector structure and to a position above the roof 8 of the intermediate housing 5.

24 designates spray-heads positioned in the water-conducting pipe above the roof 8 and from which water is sprayed onto said roof and onto the screen 11, extending therefrom to the outer housing 2.

25 designates doors in the intermediate housing 5, of which there are counterparts in the outer housing 2. These doors are provided for the purpose of permitting access to the interior of the intermediate housing 5 to beat the screen 15, surmounting the inner housing 12, whenever it may become necessary to so treat it to remove the dust therefrom to preserve its utility.

In the practical use of my dust-collector the dust to be collected is drawn by the blower 20 through the delivery-pipe 21 from the source of its production and forced through the conducting-pipe 22 into the inner housing 12 and distributed throughout said inner housing by the spreader-screen 19. As the dust is blown into the inner housing under considerable force of air it is in part carried downwardly to the screen 17 at the bottom of the housing and in part carried to the roof-screen 15 and deposited on both of said screens, while the air associated therewith finds escape through the screens into the space between the inner housing and the intermediate housing 5. In this way the greatest percentage of the dust is confined within the inner housing 12 in a dry condition, and it may from time to time be taken therefrom by gaining access through the doors 4, 6, and 16 in the series of housings of the collector. A small percentage of the dust finds egress from the inner housing 12 to the space within the intermediate housing 5, and this amount of dust is mainly prevented from escape from said intermediate housing by the screen 10 at the upper end of said housing. The finer particles of dust, however, will find egress through the screen 10, and when such particles pass through the screen they meet the resistance of the rim 9, depending from the roof 8 of the intermediate housing, and are mainly deflected downwardly in the space between said intermediate housing and the outer housing 2. The particles of dust that are not so deflected arise to the screen 12, surmounting the intermediate housing, and are retarded from escape thereby. Throughout operation of the collector water is constantly conveyed to the spray-heads 24 and therethrough, and the screen 11 is constantly sprayed and kept in a moist condition to prevent the passage of dust therethrough by moistening it and causing it to descend in the space between the intermediate and outer housings, from which space the moistened dust finds egress to the exterior of the dust-collector through the escape-space 3 in a harmless condition.

While it may not be absolutely necessary in all instances in the use of my dust-collector, I prefer to render the screens therein fireproof by applying a coating of fireproof substance thereto, such as asbestos-paint.

I claim as my invention—

1. In a dust-collector, the combination of an inner housing having exits at the top and bottom thereof, screens controlling both of said exits, and a screened housing inclosing said inner housing, substantially as set forth.

2. In a dust-collector, the combination of an inner housing having exits at the top and bottom thereof, screens controlling both of said exits, a dust-distributing screen in said inner housing, and a screened housing inclosing said inner housing, substantially as set forth.

3. In a dust-collector, the combination of an inner housing having exits at the top and bottom thereof, screens controlling both of said exits, a housing inclosing said inner housing and having an exit-opening at the top thereof, a screen controlling last-mentioned exit-opening, and a roof surmounting said inclosing housing, substantially as set forth.

4. In a dust-collector, the combination of an inner housing having exits at the top and bottom thereof, screens controlling said exits, a housing inclosing said inner housing and having an exit-opening at the top thereof, a screen controlling the last-mentioned exit-opening, a roof surmounting said inclosing housing, and a rim depending from said roof and inclosing the screen of said inclosing housing, substantially as set forth.

5. In a dust-collector, the combination of an inner housing having exits at the top and bottom thereof, screens controlling said exits, an outer housing, an intermediate housing between said inner housing and outer housing having an exit-opening at the top thereof, a screen controlling the exit-opening from said intermediate housing, a roof surmounting said intermediate housing, and a screen extending from said roof to said outer housing, substantially as set forth.

6. In a dust-collector, the combination of an inner housing having exits at the top and bottom thereof, screens controlling said exits, an outer housing, an intermediate housing between said inner housing and outer housing having a screened exit-opening at the upper end thereof, a roof surmounting said intermediate housing, a screen extending from said roof to said outer housing, and means for conducting water into the collector and spraying it onto said last-named screen, substantially as set forth.

DENIS F. HOGAN.

In presence of—
 E. S. KNIGHT,
 BLANCHE HOGAN.